United States Patent [19]

Gray et al.

[11] Patent Number: 5,313,335
[45] Date of Patent: May 17, 1994

[54] BLINDZONE SIGNAL INDICATOR

[75] Inventors: Craig S. Gray, Walton, Ind.; Christopher M. Hogge, Albuquerque, N. Mex.

[73] Assignee: Delco Electronics Corporation, Kokomo, Ind.

[21] Appl. No.: 894,672

[22] Filed: Jun. 5, 1992

[51] Int. Cl.⁵ .......................... G02B 5/08; G02B 5/20; G02B 27/00; B60R 1/12

[52] U.S. Cl. .................................. 359/839; 359/613; 362/83.1; 362/135; 340/901; 340/903

[58] Field of Search ............... 359/608, 609, 839, 871, 359/601, 613; 362/83.1, 135, 142, 61; 340/901, 903, 904, 905, 461

[56] References Cited

U.S. PATENT DOCUMENTS

| | | | |
|---|---|---|---|
| 4,641,136 | 2/1987 | Kowalczyk | 340/903 |
| 4,694,295 | 9/1987 | Miller et al. | 340/903 |
| 4,694,296 | 9/1987 | Sasaki et al. | 340/904 |
| 4,821,019 | 4/1989 | Taylor | 362/83.1 |
| 4,837,430 | 6/1989 | Hasegawa | 250/221 |
| 4,882,565 | 11/1989 | Gallmeyer | 340/461 |
| 4,906,085 | 3/1990 | Sugihara et al. | 359/839 |

OTHER PUBLICATIONS

*Pin Keyboard With Non-Obscuring Security Feature,* Research Disclosure #30859 Dec., 1989; p. 947.

*Primary Examiner*—Loha Ben
*Assistant Examiner*—Darryl Collins
*Attorney, Agent, or Firm*—Anthony Luke Simon; Mark A. Navarre

[57] ABSTRACT

A display apparatus for blindzone signal indication comprises an exterior rear view mirror housing and an exterior rear view mirror disposed in the exterior rear view mirror housing. The exterior rear view mirror defines a portion from which light is reflected and a portion through which light may be transmitted from inside the rear view mirror housing. A light source mounted within the housing is located at the light transmissive portion of the mirror and a directional filter located at the light transmitting portion of the mirror filters light emitted by the light source so that a signal from the light source may be seen from the interior of the vehicle, but may not be seen by drivers of other vehicles.

10 Claims, 2 Drawing Sheets

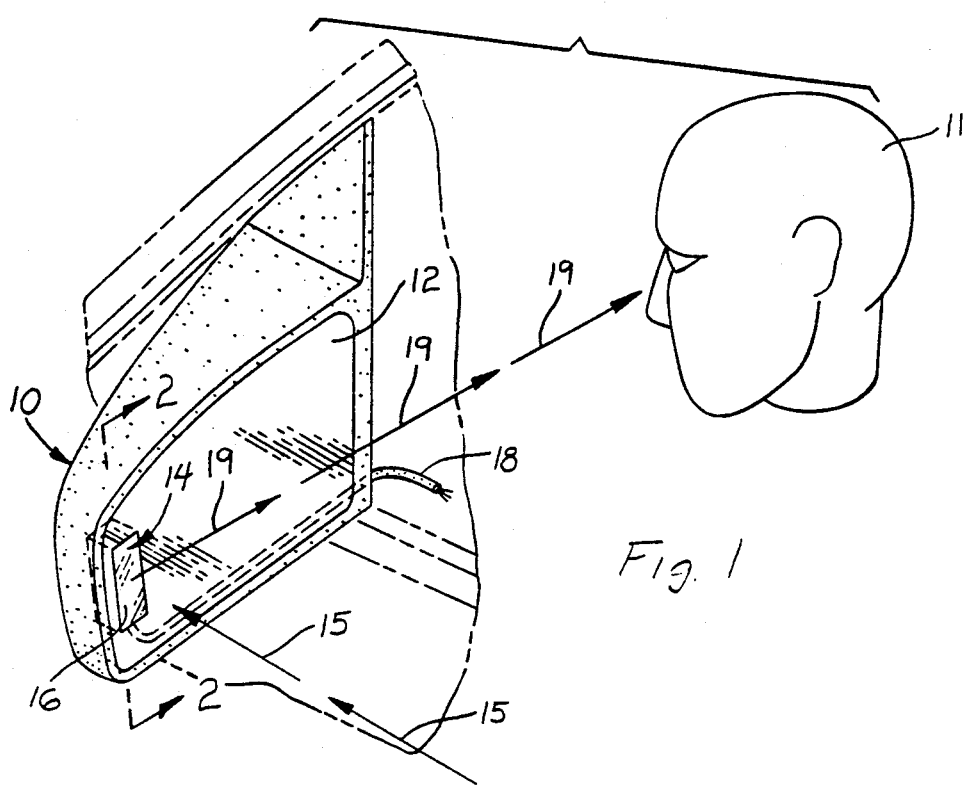
Fig. 1
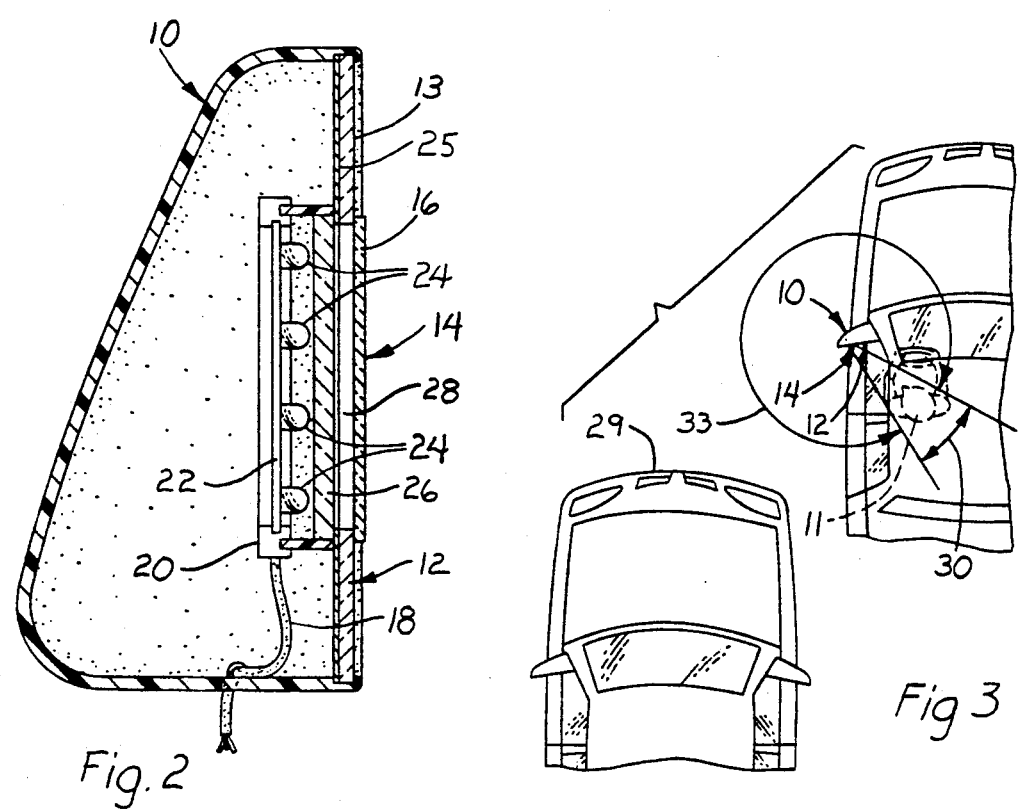
Fig. 2
Fig 3

BLINDZONE SIGNAL INDICATOR

This invention pertains to blindzone signal indicators for use in automotive vehicles.

BACKGROUND OF THE INVENTION

Many vehicle operators find that, for any particular vehicle, the entire perimeter of the vehicle is not visible through the vehicle windshield, window glass and rear view mirrors. Areas in the perimeter of the vehicle not visible in the mirrors or through the glass are referred to as blindzones.

Blindzone object detection and signaling systems are developed with the objective of alerting vehicle drivers of other vehicles in the potential blindzones.

SUMMARY OF THE INVENTION

This invention provides a blindzone signal indicator for an automotive vehicle which may be used with a blindzone object detection system to indicate to a vehicle driver the presence of another vehicle in the potential blindzone of the vehicle. Advantageously, this invention provides a blindzone signal indicator incorporated into the exterior rear view mirror or mirrors of the vehicle so that as a vehicle operator checks the exterior mirror, the blindzone signal indicator is also seen. Advantageously, the blindzone signal indicator of this invention may be used to alert a vehicle driver of another vehicle in the driver's blindzone while remaining unnoticed to the operator of the other vehicle. In this manner, this invention eliminates the appearance of a distracting signal to other vehicle drivers while providing, for the driver of the vehicle in which the display is incorporated, the blindzone object detection information.

Structurally, the apparatus of this invention comprises an exterior rear view mirror housing and an exterior rear view mirror disposed in the exterior rear view mirror housing. The exterior rear view mirror defines a portion from which light is reflected and a portion through which light may be transmitted from inside the rear view mirror housing. A light source mounted within the housing is located at the light transmissive portion of the mirror and a directional filter located at the light transmitting portion of the mirror filters light emitted by the light source so that a signal from the light source may be seen from the interior of the vehicle, but may not be seen by drivers of other vehicles. A more detailed description of this invention, along with various other improvements thereof is set forth in the description below.

BRIEF DESCRIPTION OF THE DRAWINGS

FIG. 1 is an illustration of an exterior rear view mirror including the blindzone signal indicator of this invention.

FIG. 2 is a more detailed description of the apparatus of this invention.

FIG. 3 illustrates the visible signal zone the non-signal zones provided by this invention.

DETAILED DESCRIPTION OF THE INVENTION

Figure 4:
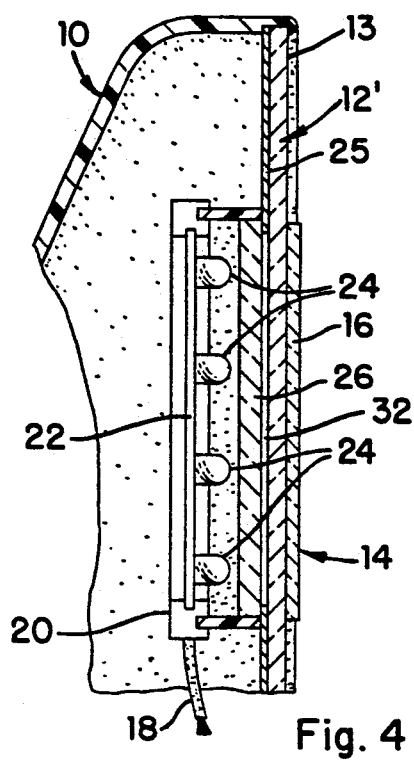
FIG. 4 illustrates a second example implementation of this invention.

Referring to FIG. 1, the apparatus of this invention comprises a blindzone signal indicator 14, incorporated into the vehicle rear view mirror 12, which is mounted into the exterior rear view mirror housing 10.

The blindzone signal indicator 14 receives signals through cable 18 from a blindzone object detector of any type known to those skilled in the art, which detects an object in the blindzone on the side of the vehicle that the rear view mirror is disposed. The example shows a driver side rear view mirror, responsive to a driver's side object detector (see, e.g., FIG. 7). Likewise, a passenger side rear view mirror may be implemented with this invention to be responsive to a passenger side object detector. Blindzone object detectors vary in operation, some using video or light signals and some using microwave or radar signals. Any suitable blindzone object detector may be used.

When an object is detected and, a signal is provided on cable 18, the blindzone signal indicator 14 illuminates, providing a visual signal to the vehicle operator 11 in the driver's seat of the vehicle by emitting light along the direction of arrows 19. When viewed from the direction of arrows 15, the signal provided by the blindzone indicator 14 is not visible. In this manner, this invention provides the advantage of alerting the vehicle driver of the presence of other vehicles in the blindzone while not distracting the drivers of the other vehicles, and also eliminating the possibility of a signal from the blindzone signal indicator 14 being confused, by other drivers, with turn signals.

Referring to FIG. 2 the cut-away view shows the housing 10 to which the rear view mirror 12 is mounted. The mirror 12 defines a hole 28 in the mirror 12 behind which, circuit board 22 is mounted within the housing 10. The hole 28 in the mirror 12 is a portion through which light may be transmitted and the remainder of the mirror 12, backed by reflective coating 25, defines portion 13, from which light is reflected. Several LED's 24 are mounted on the circuit board 22. Cable 18 provides power and an illumination signal to the LED's 24 and is connected to circuit board 22 via connector 20. A diffuser 26 is disposed between the LED's 24 and the hole 28 in the mirror 12 to provide an evenly lit light source for the blindzone signal indicator 14.

Disposed on the outer surface of the mirror 12 over the viewing hole 28 is a directional filter 16 such as a micro-louver available from 3M Corporation TM. The directional filter 16 comprises a flat sheet directional filter through which light passes in only certain angular directions and through which light is blocked from passing in the remaining angular directions. For example, a suitable directional filter 16 for use with this invention allows light to pass through at a 60° angle relative to the filter + or −8°, while tending to block light outside of that 16° window. The specific angle of the filter may very, as long as the directional filter 16 is light-transmissive for light from the light source traveling in the direction of the vehicle operator, but opaque to light from the light source traveling in all other directions. Directional filter 16 may be attached to the mirror 12 through any suitable process, including lamination.

In this manner, as shown in FIG. 3, the viewing region 30 defines a viewing window for indicator 14, at a direction in which the operator of the vehicle is located in the interior of the vehicle. Objects and people located outside viewing window 30, such as vehicles to the exterior of the vehicle and such as the driver of vehicle 29, do not see the signal emitted by signal indicator 14. Region 33 illustrates the directions for which the indicator 14 is opaque, or non-transmissive.

FIG. 4 shows a modification of a portion of the display shown in FIG. 2, providing a mirror 12' that does not define a hole 28. Instead, the reflective coating 25 of mirror 12' is omitted at region 32 behind which the light source is disposed and in front of which a directional filter is attached. In this manner, light from the light source comprising the LED's 24 and the diffuser 26 may shine through the mirror 12' by transmitting through the transmissive area defined by area 32 without requiring a hole in the mirror, as required in the example shown in FIG. 2.

Figure 5:
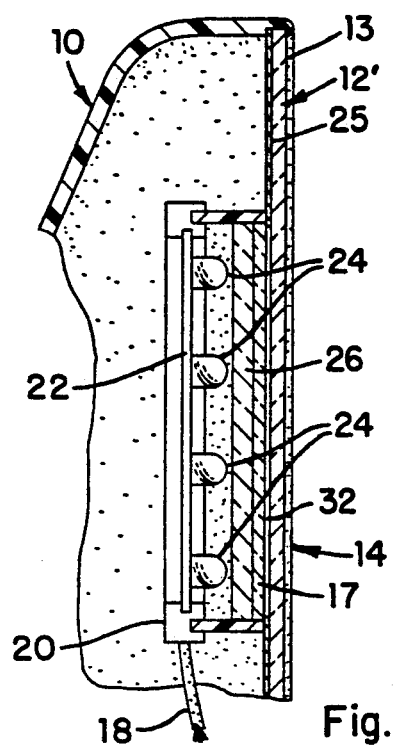
FIG. 5 illustrates a third example implementation of this invention.

FIG. 5 shows yet another variation of this invention in which the reflective coating 25 of mirror 12' coating 25 is omitted at portion 32 in front of the light source provided by the LED's 24 and diffuser 26. As shown flat directional filter 17 is provided on the inside surface 27 of the rear view mirror 12' to protect the directional filter 17 from exposure to weather and environmental conditions while still providing the function of directional indication of a blindzone signal to the vehicle operator while preventing appearance of the signal to operators of other vehicles.

Figure 6:
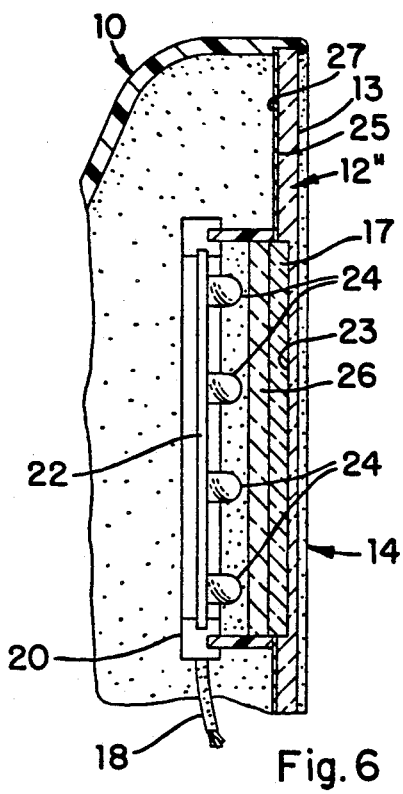
FIG. 6 illustrates a fourth example implementation of this invention.

FIG. 6 is an example implementation of this invention similar to that shown in FIG. 5 with the modification that mirror 12'' is provided with a notch or recess 23 in the backside surface 27 within which the flat directional louver 17 is disposed.

Figure 7:
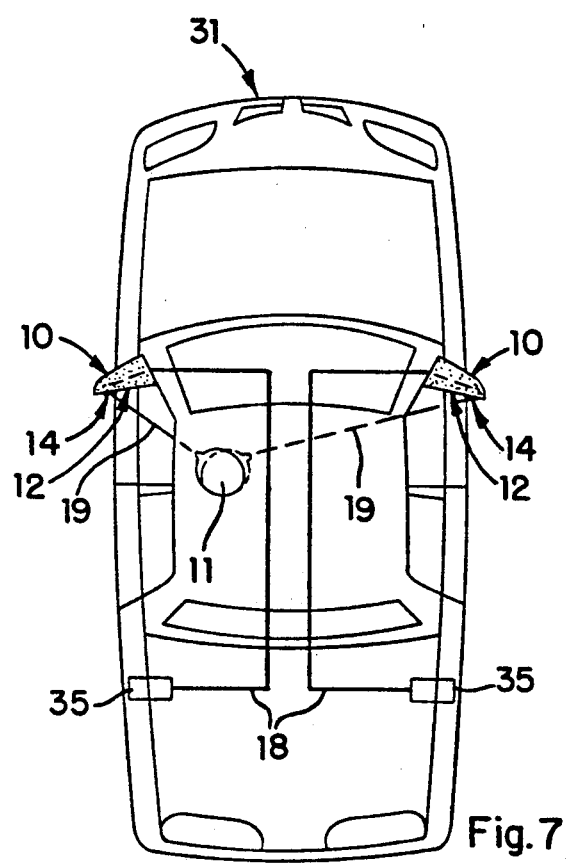
FIG. 7 illustrates a motor vehicle with left and right blindzone object detectors and indicators according to this invention.

Referring to FIG. 7, this invention is shown implemented in a vehicle to provide left and right blindzone object signals to vehicle operator 11 when objects, such as other vehicles, are in the proximity of the left and right blindzones of the vehicle. Two object detectors 35, of any suitable type well known to those skilled in the art, are positioned at the rear quarters of the vehicle 31 shown, and are connected through cables 18 to the left and right indicators 14 of this invention mounted in the left and right exterior rear view mirrors as shown. When an object, such as another vehicle, is detected by the one of the detectors 35, a signal is provided through the respective cable 18 to the respective indicator 14, illuminating the light source therein providing the blindzone indication to the vehicle operator 11.

The above described implementations of this invention are example implementations. Variations of the examples shown include alternative light sources used in place of the LED's 24 and filter 26 if desired. Other directional filters may be implemented, including metal louvers, etc. Many other improvements and modifications to this invention may occur to those skilled in the art and fall within the scope of this invention as defined below.

The embodiments of the invention in which an exclusive property or privilege is claimed are defined as follows:

1. A display apparatus for blindzone signal indication, comprising;
   an exterior rear view mirror housing;
   an exterior rear view mirror disposed in the exterior rear view mirror housing defining a first portion from which light is reflected and a second portion through which light may be transmitted from inside the rear view mirror housing;
   a light source mounted within the housing located at the second portion of the mirror; and
   a directional filter located at the second portion of the mirror so that when the light source emits light, a signal from the light source may be seen from the interior of the vehicle, but may not be seen by drivers of other vehicles, wherein the second portion of the mirror includes a hole defined by the mirror and wherein the directional filter is a flat panel directional filter laminated to the mirror over the hole.

2. The apparatus set forth in claim 1 wherein the flat panel directional filter transmits light at an angle of 60° +/−8° relative to the filter and blocks light at all other angles to the filter.

3. The apparatus set forth in claim 1 wherein the directional filter is mounted to the exterior of the vehicle mirror.

4. The apparatus set forth in claim 1 wherein the directional filter is mounted to the interior of the mirror.

5. The apparatus set forth in claim 1 wherein the light source includes four LED's.

6. The apparatus set forth in claim 1 wherein the light source, includes a diffuser.

7. A display apparatus for blindzone signal indication, comprising;
   an exterior rear view mirror housing;
   an exterior rear view mirror disposed in the exterior rear view mirror housing defining a first portion from which light is reflected and a second portion through which light may be transmitted from inside the rear view mirror housing;
   a light source mounted within the housing located at the second portion of the mirror; and
   a directional filter located at the second portion of the mirror so that when the light source emits light, a signal from the light source may be seen from the interior of the vehicle, but may not be seen by drivers of other vehicles wherein at the second portion of the mirror, the interior surface of the mirror defines a notch within which the directional filter is mounted.

8. In a motor vehicle, an apparatus comprising;
   an exterior mirror housing;
   a circuit board mounted within the housing;
   a light source mounted to the circuit board and capable of emitting light;
   an exterior rear view mirror mounted to the housing, defining a first portion through which light is reflected and a second portion through which light from the light source is transmitted; and
   a micro-louver filter mounted to the rear view mirror proximate to the second portion.

9. The apparatus set forth in claim 8, wherein the micro-louver filter transmits light emitted from the light source toward an operator of the vehicle, but is opaque to light emitted from the light source in other directions.

10. A motor vehicle comprising;
    a driver side exterior rear view mirror housing;
    a passenger side exterior rear view mirror housing;
    a first light source mounted in the driver side rear view mirror housing;
    a second light source mounted in the passenger side rear view mirror housing;

a first exterior rear view mirror mounted to the driver side rear view mirror housing, defining a first portion through which light is reflected and a second portion through which light from the first light source is transmitted;

a second exterior rear view mirror mounted to the passenger side rear view mirror housing, defining a third portion through which light is reflected and a fourth portion through which light from the second light source is transmitted;

a first micro louver filter mounted to the first exterior rear view mirror proximate to the second portion; and a second micro louver filter mounted to the second exterior rear view mirror proximate to the fourth portion, such that the first and second micro louver filters have transmission angles allowing an operator of the vehicle to see light emitted by the first and second light sources, but preventing persons not within the vehicle from seeing said emitted light.

* * * * *